(12) United States Patent
Kawada

(10) Patent No.: US 7,929,078 B2
(45) Date of Patent: Apr. 19, 2011

(54) LIQUID CRYSTAL MODULE HAVING A PAIR OF LAMP FRAMES WITH LATCHING LEG PIECES

(75) Inventor: Kazuaki Kawada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 185 days.

(21) Appl. No.: 12/140,374

(22) Filed: Jun. 17, 2008

(65) Prior Publication Data

US 2008/0316387 A1    Dec. 25, 2008

(30) Foreign Application Priority Data

Jun. 21, 2007    (JP) .................................. 2007-163263

(51) Int. Cl.
  *G02F 1/1335* (2006.01)
  *G02F 1/1333* (2006.01)
  *G09F 13/04* (2006.01)
(52) U.S. Cl. ............................. 349/70; 349/58; 362/97.2
(58) Field of Classification Search .................. 349/58, 349/59, 60, 64, 70, 71; 362/97.1, 97.2, 97.3, 362/97.4
See application file for complete search history.

(56) References Cited

U.S. PATENT DOCUMENTS

| 2003/0043310 A1* | 3/2003 | Cho ................................ 349/58 |
| 2004/0125267 A1* | 7/2004 | Noh ................................ 349/58 |
| 2004/0141102 A1* | 7/2004 | Lin ................................. 349/58 |
| 2005/0018101 A1  | 1/2005 | Choi et al. |
| 2007/0013825 A1* | 1/2007 | Kim et al. ....................... 349/58 |
| 2007/0030663 A1* | 2/2007 | Ryu ................................ 362/29 |

FOREIGN PATENT DOCUMENTS

| EP | 1 855 147 A1   | 11/2007 |
| GB | 2 417 819 A    | 3/2006  |
| JP | 2001-356323 A  | 12/2001 |

* cited by examiner

*Primary Examiner* — Mark A Robinson
*Assistant Examiner* — Paul C Lee
(74) *Attorney, Agent, or Firm* — Global IP Counselors

(57) ABSTRACT

A liquid crystal module includes a frame, a light reflecting sheet, a cold cathode tube, an optical sheet, a liquid crystal panel, a bezel and a pair of lamp frames. The frame includes a pair of opposing side plates and a bottom plate. The side plates have a plurality of engagement components. The bottom plate has a plurality of latching holes. Each of the lamp frames has a front plate part with a latching leg piece and a rear plate part with a latching component. The latching leg piece is inserted into one of the latching holes of the bottom plate of the frame to latch to the respective one of the latching hole. The latching component latches upward to respective one of the engagement components of the side plates of the frame.

12 Claims, 8 Drawing Sheets

LIQUID CRYSTAL MODULE HAVING A PAIR OF LAMP FRAMES WITH LATCHING LEG PIECES

CROSS-REFERENCE TO RELATED APPLICATIONS

This application claims priority to Japanese Patent Application No. 2007-163263 filed on Jun. 21, 2007. The entire disclosure of Japanese Patent Application No. 2007-163263 is hereby incorporated herein by reference.

BACKGROUND OF THE INVENTION

1. Field of the Invention

The present invention generally relates to a liquid crystal module. More specifically, the present invention relates to a liquid crystal module having a lamp frame attached to a frame.

2. Background Information

A conventional direct backlight type of liquid crystal module has a frame, a light reflecting sheet, a cold cathode tube, a pair of lamp frames, an optical sheet, a liquid crystal panel, and a bezel. The light reflecting sheet is provided in an interior of the frame. The cold cathode tube is disposed above the light reflecting sheet. The lamp frames are provided on an inside of opposing side plates of the frame. The optical sheet and the liquid crystal panel are disposed above the cold cathode tube. The bezel is installed from above to hold down a peripheral edge of the liquid crystal panel. With the liquid crystal module, the lamp frames are usually attached and fixed to the frame with a number of screws.

With another liquid crystal display device, when a light emitting unit and a liquid crystal display module are attached to a fixing frame, double-sided adhesive tape is used to affix the light emitting unit to the fixing frame, and the liquid crystal display module is attached with hooks formed on the fixing frame (see Japanese Laid-Open Patent Application Publication No. 2001-356323, for example).

However, when the number of screws are used to fix the lamp frame on the inside of the opposing side plates of the frame, threading the screws takes more time and work, and the cost of the screws is also entailed. As a result, the assembly work becomes less efficient and the manufacturing cost becomes higher.

Also, with the conventional liquid crystal module, end edges of the light reflecting sheet are fixed by being sandwiched between a front plate part of the lamp frame and a bottom plate of the frame. However, merely sandwiching the light reflecting sheet in this way can sometimes result in misalignment of the light reflecting sheet.

Meanwhile, with the liquid crystal display device of the Japanese Laid-Open Patent Application Publication No. 2001-356323, the hooks formed on the fixing frame are utilized when the liquid crystal module is attached to the fixing frame. Specifically, two hooks formed on a lower part of the fixing frame are merely hooked onto a lower edge of the liquid crystal module. Thus, with a quick-attachment means having such hooks, it is difficult to attach and fix the lamp frame without rattling.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a liquid crystal module with which a lamp frame can be easily and securely attached and fixed to a frame.

In accordance with one aspect of the present invention, a liquid crystal module includes a frame, a light reflecting sheet, a cold cathode tube, an optical sheet, a liquid crystal panel, a bezel and a pair of lamp frames. The frame includes a pair of opposing side plates and a bottom plate. The side plates define an interior of the frame therebetween and have a plurality of engagement components. The bottom plate is disposed between the side plates and has a plurality of latching holes formed on opposing side portions of the bottom plate. The light reflecting sheet is provided on the bottom plate of the frame. The cold cathode tube is disposed above the light reflecting sheet. The optical sheet is disposed above the cold cathode tube. The liquid crystal panel is disposed above the optical sheet. The bezel is disposed on a peripheral edge of the liquid crystal panel from above to hold down the liquid crystal panel. The lamp frames are attached to the side plates of the frame in the interior of the frame and fixed to the frame. Each of the lamp frames has a front plate part with a latching leg piece and a rear plate part with a latching component. The latching leg piece protrudes at a lower end of the front plate part toward the interior of the frame and is inserted into respective one of the latching holes of the bottom plate of the frame to latch to the respective one of the latching hole. The latching component latches upward to respective one of the engagement components of the side plates of the frame.

With the liquid crystal module of the present invention, it is possible to provide a liquid crystal module with which a lamp frame can be easily and securely attached and fixed to a frame.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following descriptions of the preferred embodiment of the present invention is provided for illustration only and not for the purpose of limiting the invention as defined by the appended claims and their equivalents.

Figure 1:
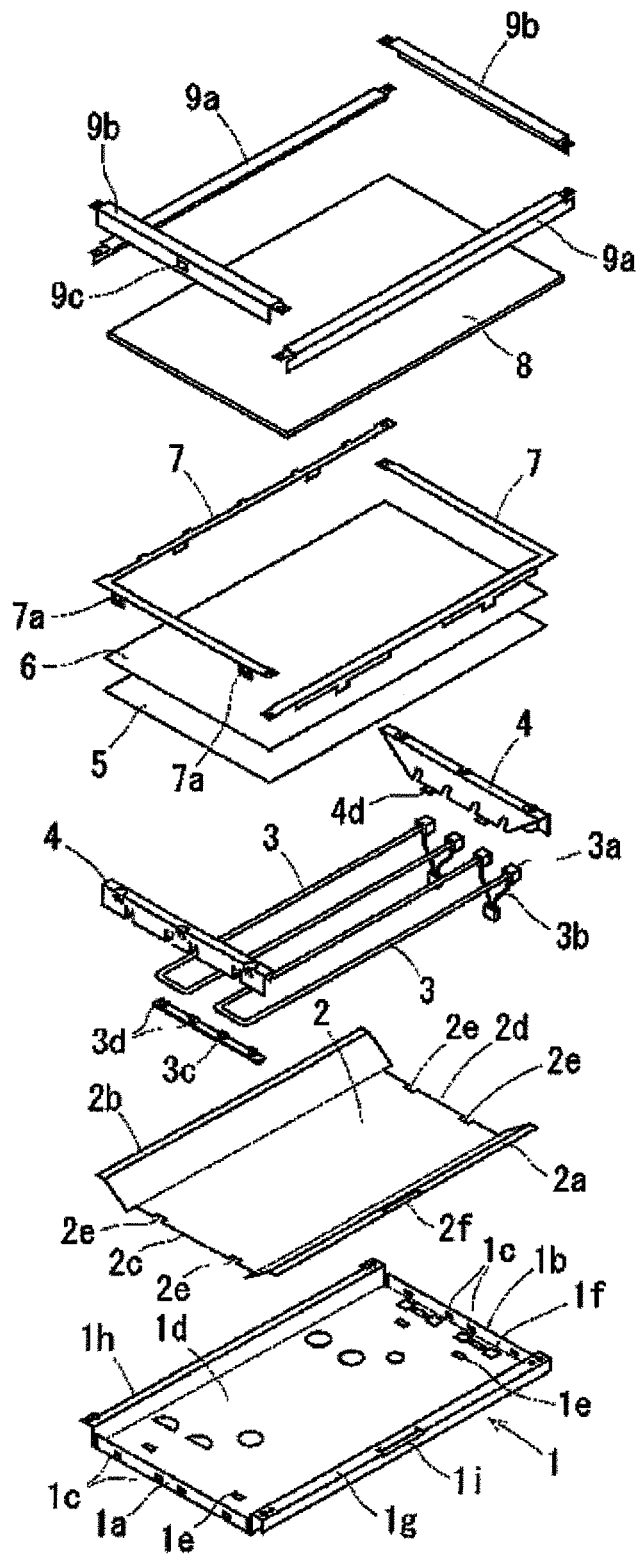
FIG. 1 is an exploded perspective view of a liquid crystal module in accordance with one embodiment of the present invention.
Figure 2:
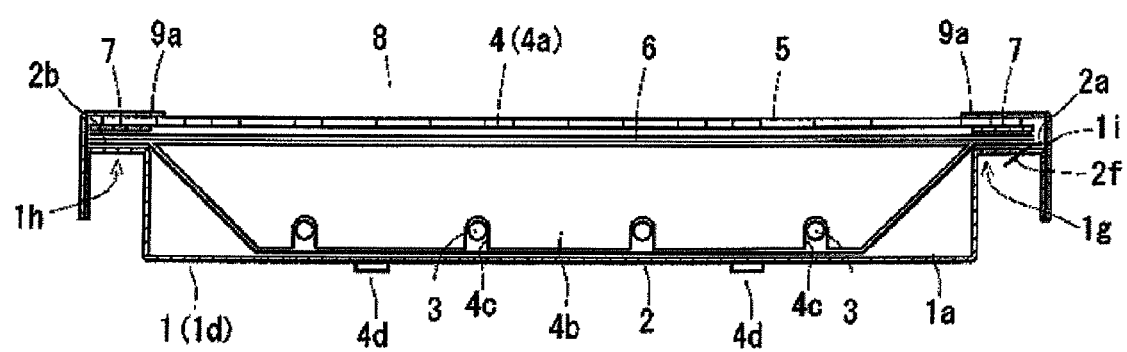
FIG. 2 is a cross sectional view of the liquid crystal module illustrated in FIG. 1.

As shown in FIGS. 1 and 2, a liquid crystal module has a frame 1, a light reflecting sheet 2, a plurality of cold cathode tubes 3, a pair of left and right lamp frames 4, a light diffusing sheet 5, a prism sheet 6, two L-shaped sheet retainer frames 7, a liquid crystal panel (liquid crystal cell) 8 and a bezel 9. The liquid crystal module is used for a personal computer or another such electronic devices. The frame 1 has left and right side plates 1a and 1b formed on opposing short sides of the frame 1. The left and right side plates 1a and 1b define an interior of the frame 1. The light reflecting sheet 2 is provided to the interior of the frame 1. The cold cathode tubes 3 are disposed above the light reflecting sheet 2. The left and right lamp frames 4 are attached on an inside of the left and right side plates 1a and 1b. The light diffusing sheet 5 and the prism sheet 6 are disposed one over the other as optical sheets. Peripheral edges of the light diffusing sheet 5 and the prism sheet 6 are held down by the sheet retainer frames 7. The liquid crystal panel 8 is placed over the sheet retainer frames 7. The bezel 9 fixes peripheral edges of the liquid crystal panel 8 from above. The bezel 9 includes four bezel parts (two long bezels 9a and two short bezels 9b). The bezel 9 is made of metal.

Figure 10:
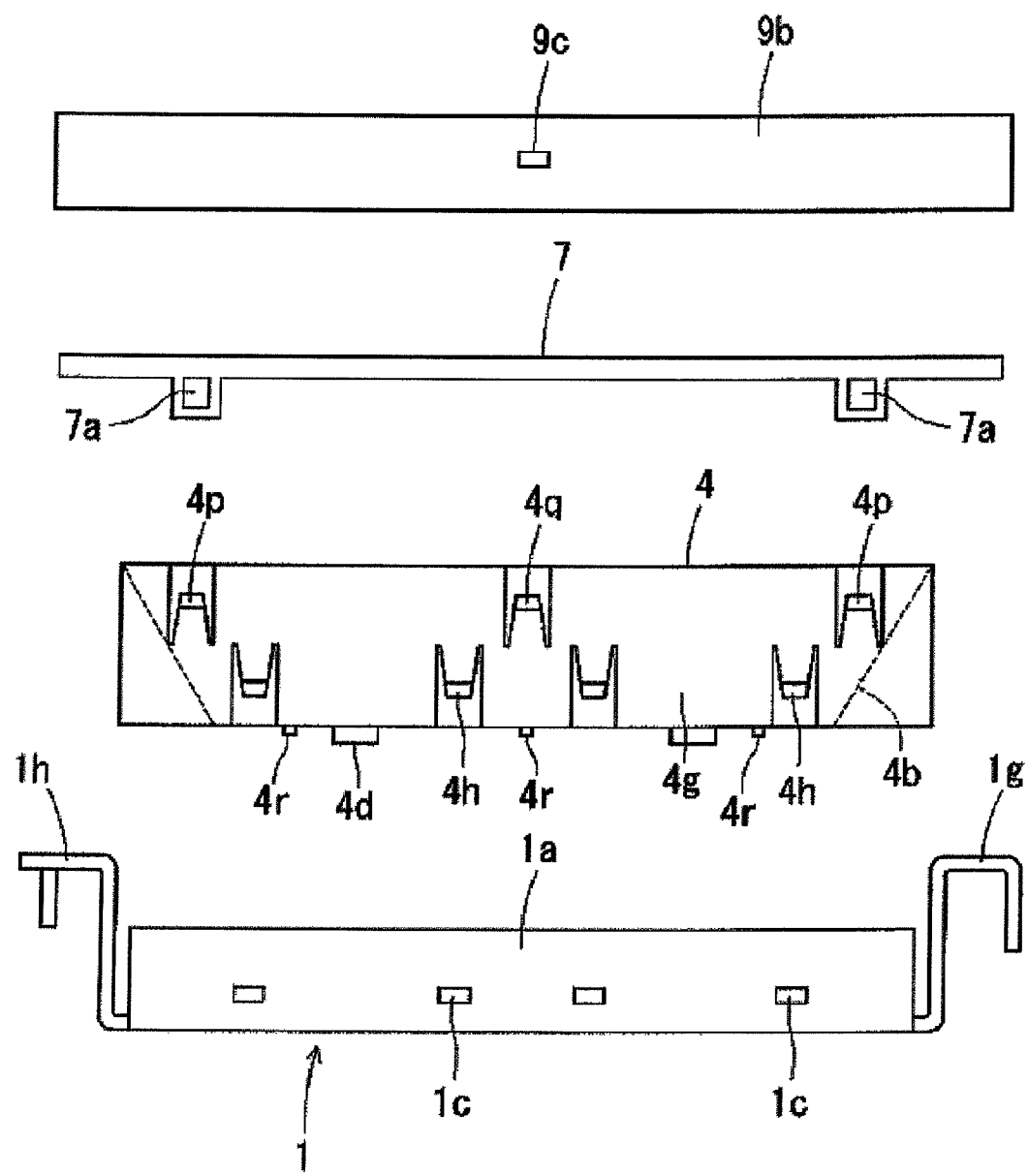
FIG. 10 is a simplified diagram illustrating an assembly of the liquid crystal module illustrated in FIG. 1.

As shown in FIG. 1, the frame 1 is made from sheet metal and is in a form of a flat, rectangular box. As shown in FIGS. 1 and 10, the frame 1 includes the left and right side plates 1a and 1b, a bottom plate 1d, two edge frame parts 1g and 1h, four rectangular engagement openings (engagement components) 1c, two rectangular engagement holes 1e, a plurality of attachment holes 1f and a slit-like opening 1i. The engagement openings 1c are formed in each of the left and right side plates 1a and 1b provided to the opposing short sides. In the engagement openings 1c, latching prong pieces 4h (discussed below) of the lamp frames 4 are latched. The engagement holes 1e are made at locations near each of left and right ends of the bottom plate 1d. In the engagement holes 1e, latching leg pieces 4d (discussed below) of the lamp frames 4 are latched. The attachment holes 1f attach a plurality of sockets 3a of the cold cathode tubes 3. The attachment holes 1f are formed in the same number as the sockets 3a (four) at the right end part of the bottom plate 1d. The slit-like opening 1i is formed in the edge frame part 1g. Into the slit-like opening 1i, a tab piece 2f (discussed below) of the light reflecting sheet 2 is inserted. The edge frame parts 1g and 1h are provided on opposing long sides of the frame 1.

The light reflecting sheet 2 includes a UV blocking layer. The UV blocking layer prevents degradation by UV rays. The UV blocking layer is formed on a surface (upper face) of a light-reflecting synthetic resin sheet having a white pigment. With the Uv blocking layer facing up, the light reflecting sheet 2 is bent into an inverted trapezoidal shape as shown in FIGS. 1 and 2. The light reflecting sheet 2 has a pair of end edge parts 2a and 2b, a tab piece 2f, two recesses 2e formed at each of left and right end edge portions 2c and 2d. The end edge parts 2a and 2b are formed on opposing long sides of the light reflecting sheet 2, and are placed on the opposing edge frame parts 1g and 1h of the frame 1 so that the light reflecting sheet 2 is installed in the frame 1.

Figure 3:
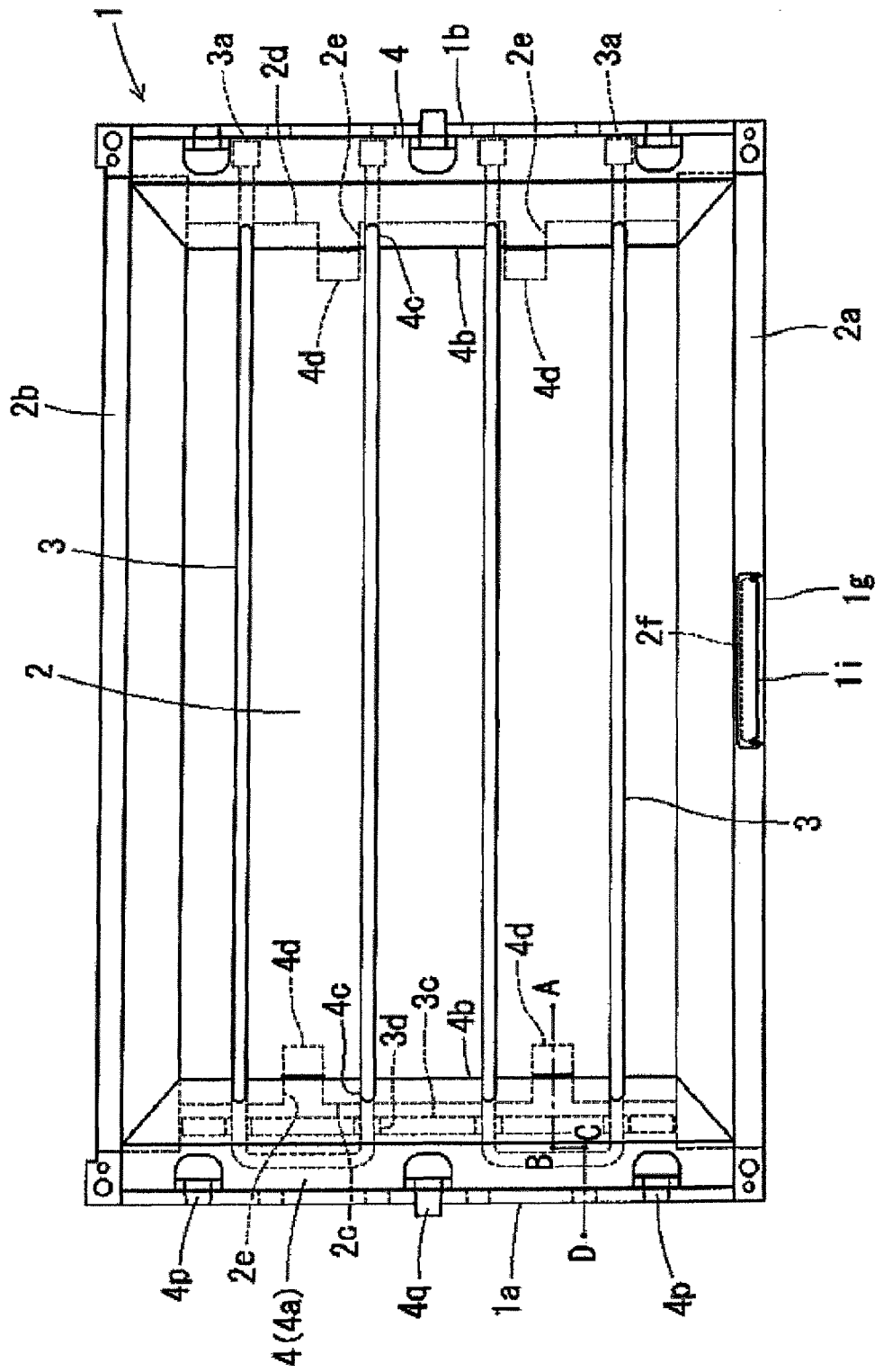
FIG. 3 is a front elevational view of a main part of the liquid crystal module illustrated in FIG. 1.

As shown in FIGS. 1 and 3, the tab piece 2f is formed by making a flat U-shaped cut in the end edge part 2a. As shown in FIGS. 2 and 3, the tab piece 2f is accurately positioned merely by being inserted into and engaged with a lower side of the edge frame part 1g from the slit-like opening 1i of the edge frame part 1g of the frame 1 toward an inside of the frame 1. As a result, the light reflecting sheet 2 can be quickly held in place.

As shown in FIGS. 1 and 3, the recesses 2e are formed in each of the left and right end edge portions 2c and 2d located on opposing left and right short sides of the light reflecting sheet 2. The latching leg pieces 4d (discussed below) of the lamp frames 4 are passed through the recesses 2e. The positional relationship between the recesses 2e on the left end edge portion 2c and the recesses 2e on the right end edge portion 2d is an asymmetrical relationship. As will be discussed below, spacing between the latching leg pieces 4d of the left lamp frame 4 on a left side is greater than (is different from) spacing between the latching leg pieces 4d of the right lamp frame 4 on a right side. Thus, spacing between the recesses 2e of the left end edge portion 2c is made correspondingly greater than (is different from) spacing between the recesses 2e of the right end edge portion 2d. Since the positional relationship of the recesses 2e is thus made asymmetric on the left and right, it is easy to tell that the light reflecting sheet 2 is upside-down even if the positional relationship of the recesses 2e of the left and right end edge portions 2c and 2d is switched around. As a result, the light reflecting sheet 2 is reliably prevented from being attached to the frame 1 with the UV blocking layer on the surface of the light reflecting sheet 2 accidentally turned to the back.

The cold cathode tubes 3 are disposed above the light reflecting sheet 2. Each of the cold cathode tubes 3 is bent in a U shape as shown in FIG. 1. The sockets 3a are attached to both ends of each U-shaped cold cathode tube 3. The sockets 3a are made of an insulating rubber. Cables 3b equipped with connectors are connected to the sockets 3a.

The cold cathode tubes 3 are attached as follows. The sockets 3a at the both ends are fitted and fixed in the attachment holes 1f of the frame 1. The connector-equipped cables 3b are taken outside through access openings formed between the attachment holes 1f. Then, as shown in FIGS. 1, 3, 8 and 9, bent portions on the opposite side of the cold cathode tubes 3 are supported by supports 3d of a lamp holder 3c. The lamp holder 3c is fixed to the bottom plate 1d of the frame 1.

Figure 4A:
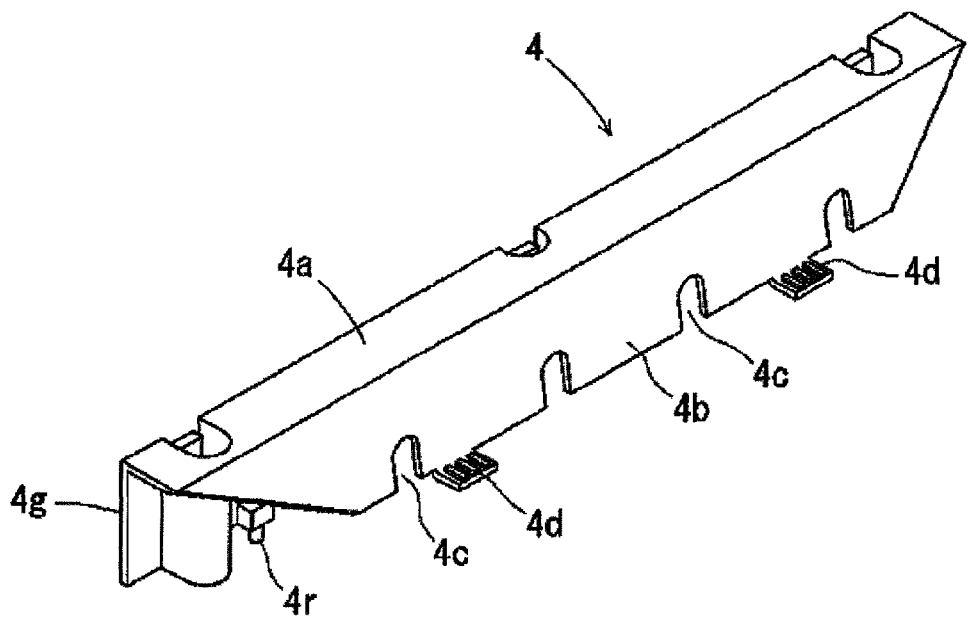
FIG. 4A is a perspective view showing a front side of a lamp frame of the liquid crystal module illustrated in FIG. 1.

The left and right lamp frames 4 are light-reflecting molded articles made by injection molding a synthetic resin containing a white pigment. The left and right lamp frames 4 cover the lamp holder 3c and the sockets 3a of the cold cathode tubes 3. Each of the left and right lamp frames 4 includes a top plate 4a, a front plate 4b, a pair of latching leg pieces 4d, a plurality of latching prong pieces 4h, a vertical rear plate 4g, a pair of side latching prong components 4p, a middle latching prong component 4q and a plurality of positioning pins 4r. The front plate 4b angles diagonally downward from the top plate 4a. As shown in FIG. 4A, four cut-outs 4c are formed in a lower part of the front plate 4b. The cold cathode tubes 3 are inserted through the cut-outs 4c. The latching leg pieces 4d are formed at a lower end of the front plate 4b. The latching leg pieces 4d protrude forward (inward) from the lower end of the front plate 4b.

The positions where the latching leg pieces 4d are formed are different on the left and right lamp frames 4. As shown in FIG. 3, the spacing between the latching leg pieces 4d on the left lamp frame 4 is greater than (is different from) the spacing between the latching leg pieces 4d on the right lamp frame 4 located on the opposite side. Furthermore, spacing between the engagement holes 1e near the left end of the frame bottom plate 1d in which the latching leg pieces 4d are inserted and latched, and the spacing between the recesses 2e in the left end edge part of the light reflecting sheet 2, are greater than (are different from) spacing between the engagement holes 1e near the right end, and the spacing between the recesses 2e in the right end edge part, respectively. As shown in FIGS. 1 and 3, the positional relationship of the latching leg pieces 4d of the lamp frames 4, the positional relationship of the engagement holes 1e near the left and right ends of the frame 1, and the positional relationship of the recesses 2e at the left and right end edge portions of the light reflecting sheet 2 are all in left and right asymmetry.

Figure 6:
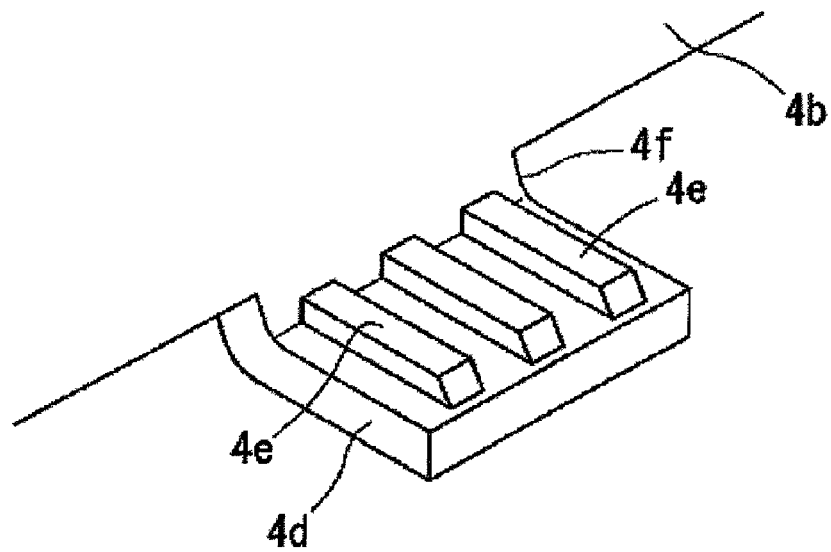
FIG. 6 is a detailed perspective view of a latching leg piece of the lamp frame illustrated in FIG. 4A.

As shown in FIG. 6, each of the latching leg pieces 4d of the lamp frame 4 has a plurality of (three) rectangular bulges (e.g., bulge sections) 4e and a curve (e.g., curve section) 4f. The bulges 4e are higher formed on an upper face of each of the latching leg pieces 4d. The curve 4f is formed at an inside corner between the latching leg piece 4d and the front plate 4b of the lamp frame 4. The latching leg pieces 4d are reinforced at a base portion by the curve 4f. Thus, damage or destruction of the base portion of the latching leg pieces 4d is prevented. Furthermore, upper faces of the bulges 4e are allowed to be latched to edges of the engagement holes 1e in the frame bottom plate 1d without being interrupted by the curve 4f.

Figure 4B:
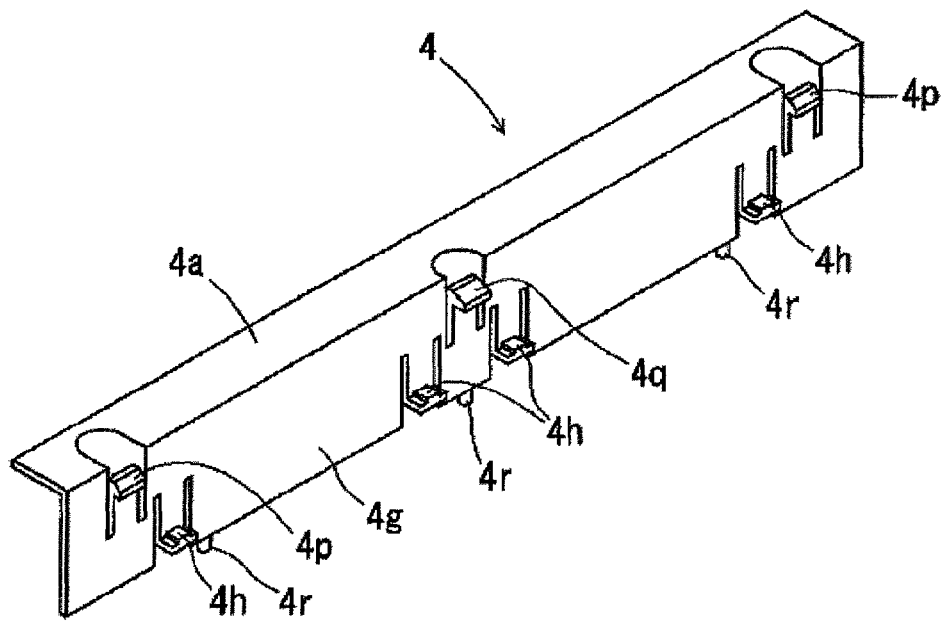
FIG. 4B is a perspective view showing a rear side of the lamp frame of the liquid crystal module illustrated in FIG. 1.
Figure 5:
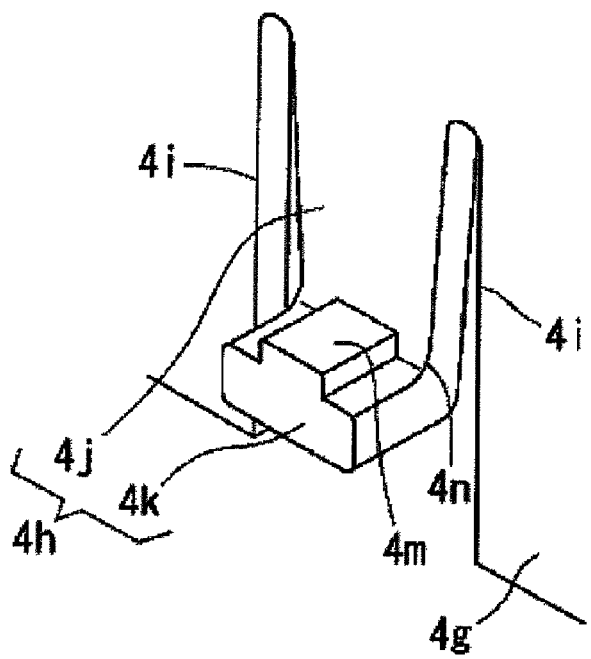
FIG. 5 is a detailed perspective view of a latching prong piece of the lamp frame illustrated in FIG. 4B.

As shown in FIGS. 4B and 10, four latching prong pieces 4h are formed at a lower part of the vertical rear plate 4g of the lamp frame 4. The latching prong pieces 4h fix the lamp frame 4. The latching prong pieces 4h are latched upward from an inside of the left and right side plates 1a and 1b into the engagement openings 1c formed in the left and right side plates 1a and 1b of the frame 1. As shown in FIG. 5, each of the latching prong pieces 4h has a spring piece 4j and a latching prong 4k. The spring piece 4j is formed by making a pair of cut-outs 4i from below in the vertical rear plate 4g of the lamp frame 4. The latching prong 4k protrudes from a lower end of the spring piece 4j. A rectangular bulge (e.g., bulge portion) 4m is formed on an upper face of the latching prong 4k so that an upper face of the bulge 4m is located higher than the upper face of the latching prong 4k. A curve (e.g., curve portion) 4n is provided to an inside corner between the spring pieces 4j and the latching prongs 4k.

Figure 8:
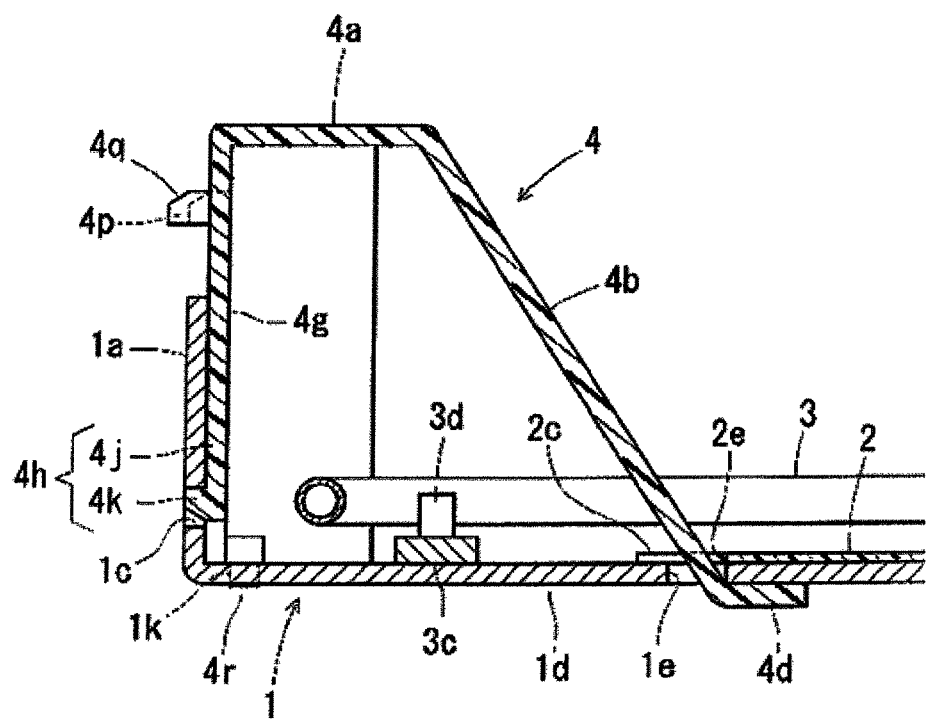
FIG. 8 is a partial cross sectional view of the liquid crystal module taken along A-B-C-D line shown in FIG. 3.

As shown in FIG. 8, the latching prong pieces 4h make use of the elasticity of the spring pieces 4j. Thus, the latching prongs 4k are allowed to be easily fitted into the engagement openings 1c and latched upward. Also, since a base portion of each of the latching prongs 4k is reinforced by the curve 4n, damage or destruction of the base portion of the latching prong 4k can be prevented. Furthermore, the upper face of the bulge 4m can be latched to the engagement hole 1c without being interrupted by the curve 4n.

Figure 7:
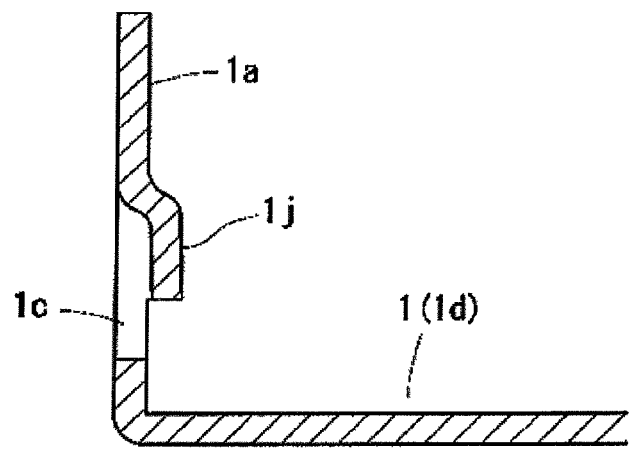
FIG. 7 is a partial cross sectional view of the liquid crystal module illustrated in FIG. 1.

As shown in FIG. 7, the engagement openings 1c can be such that upper edge portions 1j of the engagement openings 1c are bent inward of the left and right side plates 1a and 1b. This bending allows the latching prongs 4k of the latching prong pieces 4h to latch more deeply to the upper edge portions 1j, all the way to the base portions of the latching prongs 4k. Thus, the latching prongs 4k are effectively prevented from coming out of the engagement openings 1c.

As shown in FIGS. 4A, 4B and 10, the side latching prong components 4p and the middle latching prong component 4q are formed at an upper part of the rear plate 4g of the lamp frame 4. The side latching prong components 4p are used to fix the sheet retainer frames 7. Specifically, the side latching prong components 4p are fitted into engagement holes 7a of the sheet retainer frames 7 and latching downward. The middle latching prong component 4q is used to fix the bezel 9. Specifically, the middle latching prong component 4q is fitted into a middle engagement hole 9c formed on each of the short bezels 9b and latching downward. Each of the side and middle latching prong components 4p and 4q has a latching prong and a spring piece. The latching prong protrudes from an upper end of the spring piece formed by making a cut-out. The latching prong of the middle latching prong component 4q used to fix the bezel 9 protrudes farther than the latching prongs of the side latching prong components 4p used to fix the sheet retainer frame 7.

As shown in FIGS. 4A, 4B, 8 and 9, three positioning pins 4r are formed at a lower end on the inside of the rear plate 4g of the lamp frame 4. The positioning pins 4r include a middle positioning pin 4r and a pair of side positioning pin 4r formed at two ends. The positioning pins 4r protrude downward. The positioning pins 4r are inserted into positioning holes 1k formed in the bottom plate 1d of the frame 1. The positioning hole 1k into which the middle positioning pin 4r is inserted is a burred circular hole. On the other hand, the positioning holes 1k into which the side positioning pins 4r are inserted is an elliptical hole that accommodates thermal expansion and contraction, etc., of the lamp frame 4.

Figure 9:
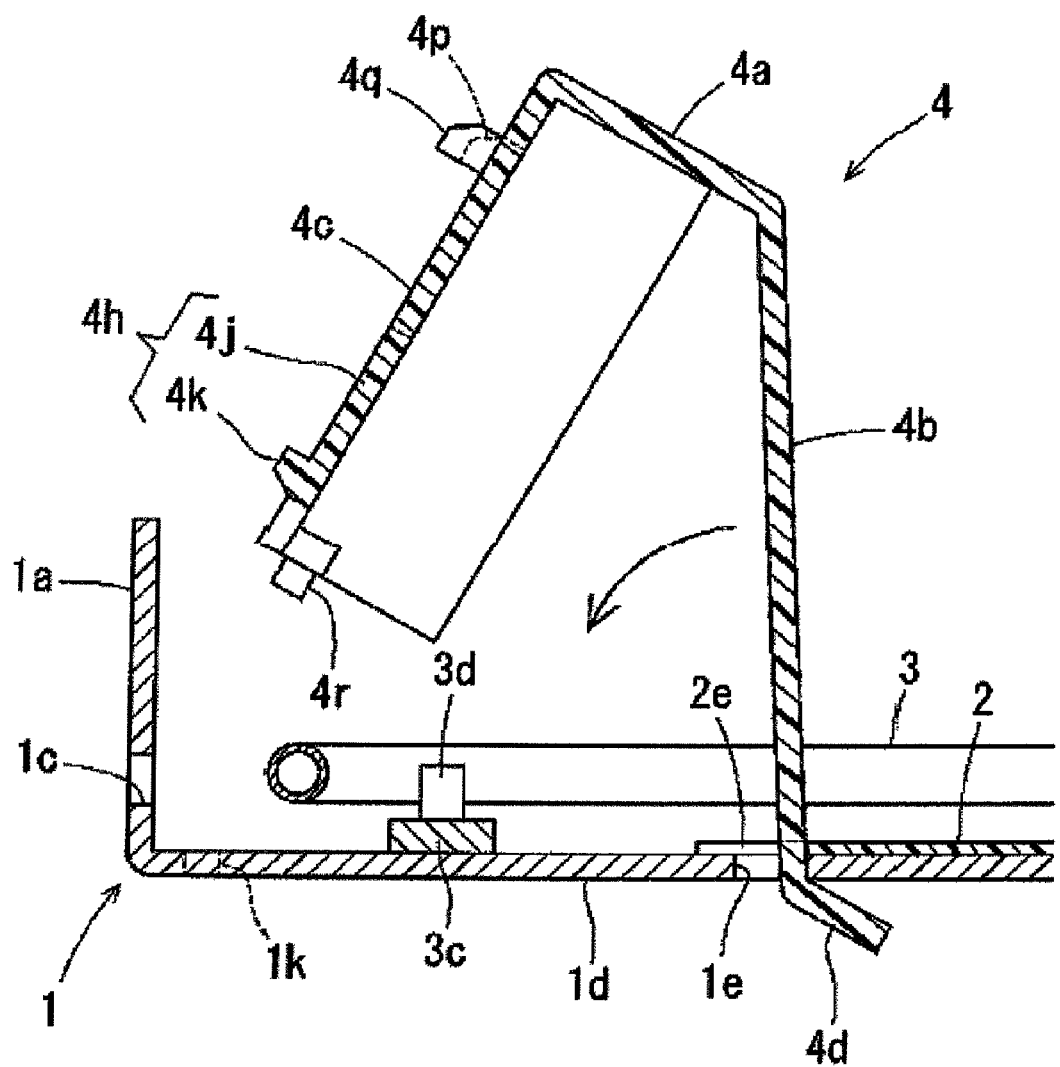
FIG. 9 is a partial cross sectional view illustrating a state when the lamp frame is tilted forward to insert the latching leg piece in an engagement hole of the frame.

The lamp frames 4 are simply attached and fixed in the following manner. Specifically, as shown in FIG. 9, the lamp frame 4 is tilted forward and the latching leg pieces 4d are inserted through the recesses 2e in the light reflecting sheet 2 and into the engagement holes 1e in the frame bottom plate 1d from above. The latching leg pieces 4d are hooked to the edges of the engagement holes 1e to form a fulcrum. Then, the lamp frame 4 is rotated to the rear around the fulcrum as indicated by the arrow. The elasticity of the spring pieces 4j of the latching prong pieces 4h is utilized to fit the latching prongs 4k into the engagement openings 1c of the left and right side plates 1a and latch the engagement openings 1c upward, and to latch the latching leg pieces 4d to the edges of the engagement holes 1e of the frame bottom plate 1d. As a result, attaching and fixing the lamp frames 4 is completed.

The lamp frames 4 are attached and fixed on the inside of the left and right side plates 1a in a simple manner, without the use of screws. Furthermore, in the attached and fixed state, upward movement of the lamp frame 4 is restricted by the latching leg pieces 4d and the latching prong pieces 4h, forward movement of the lamp frame 4 is restricted by the latching leg pieces 4d, rearward movement of the lamp frame 4 is restricted by the left and right side plates 1a of the frame 1, and lengthwise movement of the lamp frame 4 is restricted by the latching leg pieces 4d, the latching prong pieces 4h, and the edge frame parts 1g and 1h of the frame 1. Thus, the lamp frame 4 is held securely with substantially no rattling.

When the lamp frames 4 are attached and fixed as above, the left and right end edge portions 2c and 2d of the light reflecting sheet 2 are held down by the lower ends of the front plates 4b of the lamp frames 4. Thus, movement of the left and right end edge portions 2c and 2d of the light reflecting sheet 2 is restricted by the latching leg pieces 4d of the lamp frames 4 inserted in the recesses 2e of the light reflecting sheet 2. Therefore, the light reflecting sheet 2 is fixed in a state of being accurately positioned.

As shown in FIG. 2, four peripheral edges of the light diffusing sheet 5 and the prism sheet 6 that is superposed thereover are placed over the top plates 4a of the lamp frames 4 and the end edge parts 2a and 2b of the light reflecting sheet 2 superposed over the edge frame parts 1g and 1h of the frame 1. The light diffusing sheet 5 and the prism sheet 6 are held down from above by the sheet retainer frames 7. The sheet retainer frames 7 are made of a synthetic resin and put together in a rectangular frame shape. As shown in FIGS. 1 and 10, engagement holes 7a are formed on short frame parts of the retainer frames 7. The engagement holes 7a engage with the latching prong components 4p of the lamp frames 4. Specifically, the latching prong components 4p of the lamp frames 4 are latched downward to the engagement holes 7a, thereby attaching the sheet retainer frames 7. Furthermore, the sheet retainer frames 7 are positioned by inserting positioning pins (not shown) formed in corner portions of the sheet retainer frames 7 into positioning holes formed in corner portions of the frame 1.

The peripheral edges of the liquid crystal panel 8 are placed over the sheet retainer frames 7. The liquid crystal panel 8 is fixed from above with the bezel 9, thereby completing the assembly of the liquid crystal module. The long and short bezels 9a and 9b are put together in the form of a rectangular frame and fixed at the corners with screws to the frame 1. A middle part of the short bezels 9b can be prevented from lifting up and creating a gap by latching the middle latching prong components 4q of the lamp frames 4 downward to the middle engagement hole 9c. The long bezels 9a are attached without any gap by fixing the long bezels 9a in the middle with screws to the frame 1.

With the liquid crystal module, the latching leg pieces 4d of the lamp frames 4 are inserted through the recesses 2e in the light reflecting sheet 2 into the engagement holes 1e in the frame bottom plate 1d and are latched upward to the edges of the engagement holes 1e. The latching prongs 4k of the latching prong pieces 4h of the lamp frames 4 are latched upward to the engagement openings 1c of the left and right side plates 1a. Thus, the lamp frames 4 are allowed to be attached and fixed simply and without rattling, without the use of any screws. As a result, assembly work becomes easier and the number of parts can be reduced and the screw threading step can be eliminated. Furthermore, the manufacturing cost can be reduced. Also, since the latching leg pieces 4d of the lamp frames 4 are passed through the recesses 2e in the light reflecting sheet 2, misalignment of the light reflecting sheet 2 can be prevented.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A liquid crystal module comprising:
   a frame including a pair of opposing side plates defining an interior of the frame therebetween and having a plurality of engagement components, and a bottom plate disposed between the side plates and having a plurality of latching holes formed on opposing side portions of the bottom plate;
   a light reflecting sheet provided on the bottom plate of the frame;
   a cold cathode tube disposed above the light reflecting sheet;
   an optical sheet disposed above the cold cathode tube;
   a liquid crystal panel disposed above the optical sheet;
   a bezel disposed on a peripheral edge of the liquid crystal panel from above to hold down the liquid crystal panel; and
   a pair of lamp frames attached to the side plates of the frame in the interior of the frame and fixed to the frame, each of the lamp frames having
      a front plate part with a latching leg piece that protrudes at a lower end of the front plate part toward the interior of the frame and is inserted into respective one of the latching holes of the bottom plate of the frame to latch to the respective one of the latching hole, and
      a rear plate part with a latching component that latches upward to respective one of the engagement components of the side plates of the frame,
   the light reflecting sheet further having a plurality of recesses that is formed at opposing end edges of the light reflecting sheet, the latching leg pieces of the lamp frames being disposed through the recesses of the light reflecting sheet, respectively, such that the latching leg pieces of the lamp frames restrict movement of the light reflecting sheet relative to the frame,
   each of the lamp frames housing respective one of end portions of the cold cathode tube within an inside space of each of the lamp frames, with the inside space being defined between the front plate and the rear plate of each of the lamp frames.

2. The liquid crystal module according to claim 1, wherein each of the latching components of the lamp frames includes a latching prong piece having a spring piece and a latching prong formed at a lower end of the spring piece, and
each of the engagement components of the side plates of the frame includes an engagement opening into which the latching prong of the latching prong piece is fitted.

3. The liquid crystal module according to claim 2, wherein the latching prong piece further has a bulge portion bulging upward from an upper face of the latching prong, and a curve portion provided to an inside corner between the spring piece and the latching prong.

4. The liquid crystal module according to claim 2, wherein an upper edge portion of the engagement opening is bent toward the interior of the frame.

5. The liquid crystal module according to claim 1, wherein the latching leg piece further has a bulge section bulging upward from an upper face of the latching leg piece, and a curve section provided to an inside corner between the latching leg piece and the front plate part of the light lamp frame.

6. The liquid crystal module according to claim 1, wherein a positional relationship between the latching leg pieces of the lamp frames, a positional relationship between the latching holes formed on the opposing side portions of the bottom plate of the frame, and a positional relationship between the recesses formed at the opposing end edges of the light reflecting sheet have asymmetrical relationships.

7. The liquid crystal module according to claim 2, wherein a positional relationship between the latching leg pieces of the lamp frames, a positional relationship between the latching holes formed on the opposing side portions of the bottom plate of the frame, and a positional relationship between the recesses formed at the opposing end edges of the light reflecting sheet have asymmetrical relationships.

8. The liquid crystal module according to claim 5, wherein a positional relationship between the latching leg pieces of the lamp frames, a positional relationship between the latching holes formed on the opposing side portions of the bottom plate of the frame, and a positional relationship between the recesses formed at the opposing end edges of the light reflecting sheet have asymmetrical relationships.

9. The liquid crystal module according to claim 1, wherein each of the lamp frames further has a positioning pin formed at a lower end portion of the lamp frame and protruding downward, and
the bottom plate of the frame further has a plurality of positioning holes formed at locations corresponding to the positioning pins and in which the positioning pins are inserted.

10. The liquid crystal module according to claim 2, wherein
each of the lamp frames further has a positioning pin formed at a lower end portion of the lamp frame and protruding downward, and
the bottom plate of the frame further has a plurality of positioning holes formed at locations corresponding to the positioning pins and in which the positioning pins are inserted.

11. The liquid crystal module according to claim 5, wherein
each of the lamp frames further has a positioning pin formed at a lower end portion of the lamp frame and protruding downward, and
the bottom plate of the frame further has a plurality of positioning holes formed at locations corresponding to the positioning pins and in which the positioning pins are inserted.

12. The liquid crystal module according to claim 6, wherein
each of the lamp frames further has a positioning pin formed at a lower end portion of the lamp frame and protruding downward, and
the bottom plate of the frame further has a plurality of positioning holes formed at locations corresponding to the positioning pins and in which the positioning pins are inserted.

* * * * *